Patented June 12, 1934

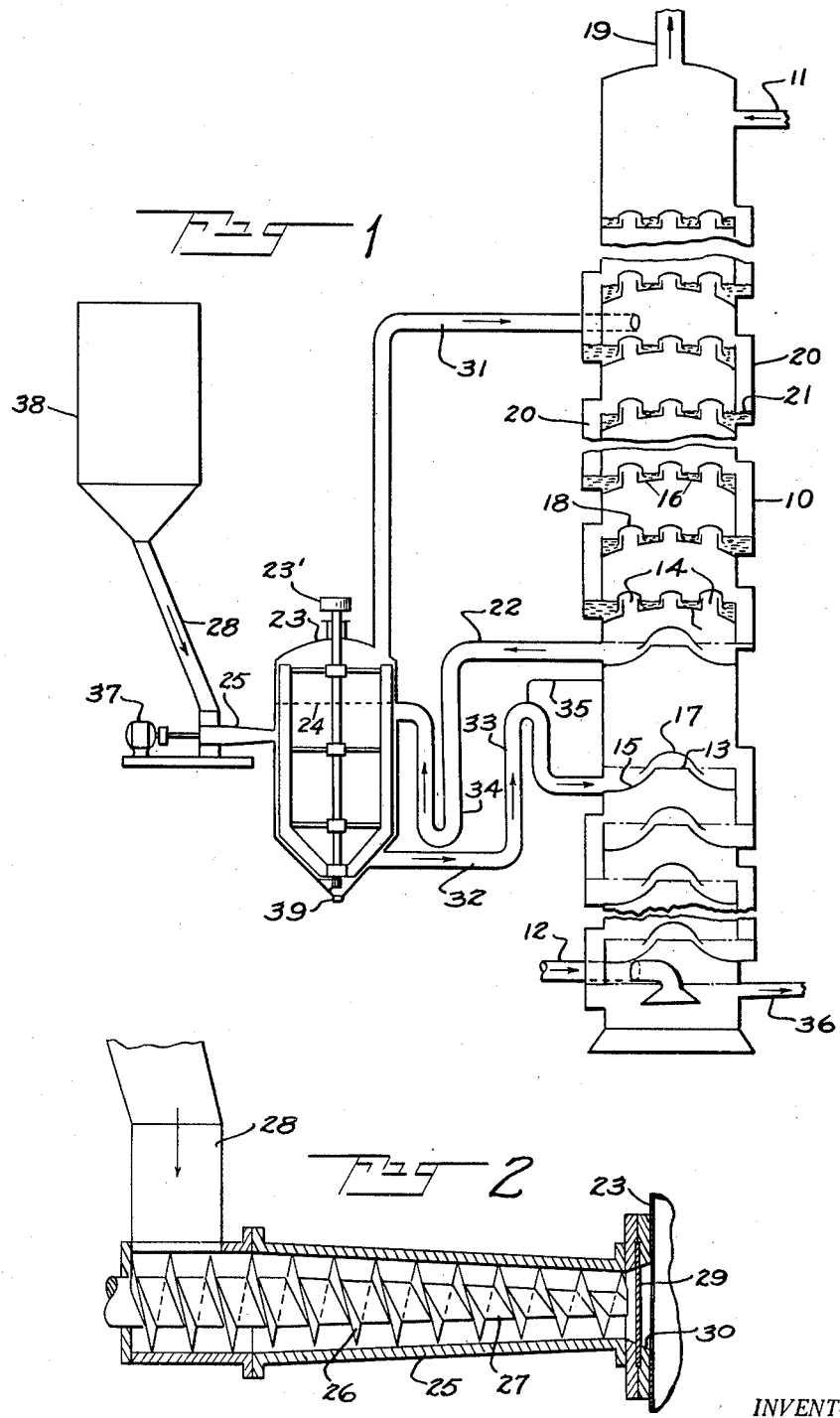

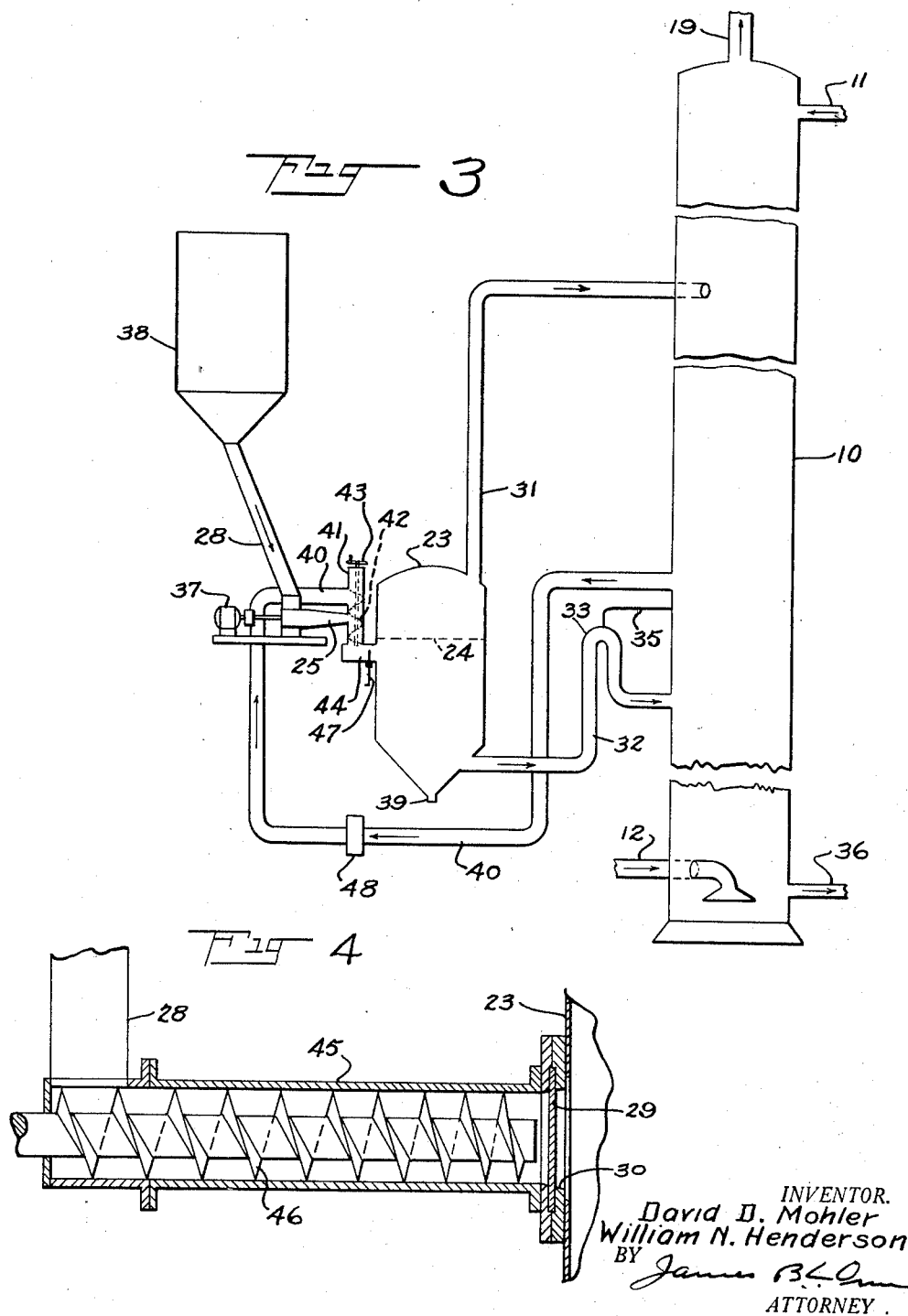

1,962,150

UNITED STATES PATENT OFFICE 1,962,150

PROCESS AND APPARATUS FOR DRY LIME TREATMENT OF LIQUORS

David D. Mohler and William N. Henderson, Syracuse, N. Y., assignors to The Solvay Process Company, Solvay, N. Y., a corporation of New York Application June 11, 1927, Serial No. 198,182

16 Claims. (Cl. 23—193)

This invention relates generally to the recovery of ammonia from aqueous ammonia liquors, particularly liquors containing ammonia not recoverable by heat, and commonly referred to as fixed ammonia, for example, ammonium chloride.

An example of such a liquor is that obtained in the so-called Solvay or ammonia soda process for the production of bicarbonate of soda. As is well known, this process consists in saturating a solution of sodium chloride with ammonia gas and in treating the ammoniacal brine with carbon dioxide in a carbonating tower. The liquor remaining after the formation and removal of the precipitated bicarbonate of soda contains carbon dioxide and ammonia in both "free" and "fixed" forms, i. e., ammonia recoverable by heating the liquor, and ammonia not so recoverable.

The recovery of the carbon dioxide and the free ammonia of the liquor is relatively simple since a process of distillation, through the use of heat provided for example by a supply of steam, will effect the desired result. Recovery of the fixed ammonia, however, which is present in the form of ammonium chloride mainly, is somewhat more difficult. The ammonia, however, can be recovered from the ammonium chloride by treatment of the liquor with lime.

It has long been recognized that the use of dry quick lime as a reagent in the treatment of the ammoniacal liquor to free the fixed ammonia would prove the most economical method of using lime for this purpose if certain difficulties attending its use for this purpose could be overcome. Attempts have been made to use dry lime for this purpose and a disclosure of the use of dry lime for setting free the ammonia is to be found in the early patent to Solvay No. 198,699, of December 25th, 1877.

The process of this Patent No. 198,699 was extensively used in commercial practice in the early days of the industry, but was abandoned in favor of the present general practice in which milk of lime is used as the reagent for the following reasons, among others.

The process disclosed in Patent No. 198,699 is of the batch type and is for this reason relatively unsatisfactory as compared with a continuous process for commercial use such as milk of lime makes possible. Again, the utilization of the lime must be substantially complete and it was practically impossible to bring about a sufficiently complete reaction under the conditions described in this patent.

Hitherto, so far as we are aware, no method of utilizing dry lime in a continuous process has been successful because it is extremely difficult to introduce solid lime into a reaction receptacle or container, such as a distilling apparatus in which there is gas pressure, in a continuous and regulated manner and without the accompanying loss of gas or liquid from the system, it being evident that there is a vigorous and abundant evolution of gas when the dry lime is brought into contact with the ammoniacal liquid in the container and that the distilling system as a whole is under a pressure above that the ordinary atmosphere. It is also difficult to introduce dry lime to ammonia liquor through a pipe or conduit for the reason that in the presence of such liquor or the vapors of such liquor there is a tendency for a hard, cement-like material to be formed which adheres to adjacent surfaces in the form of scale. These difficulties have been overcome by the present invention.

The method for the recovery of fixed ammonia from liquors of the nature referred to, and which has been employed generally, has comprised the use of milk of lime for the purpose, i. e., lime in fluid form as solution or suspended in liquid. Although milk of lime for use in treating the ammonium chloride content of ammoniacal liquors has gone into general and extensive use, it is open to serious objections.

The advantages of the use of dry lime as hereinafter specified include the elimination of the step of producing milk of lime by the treatment of quick lime with water with a corresponding saving in the operative steps of the process. Again when dry lime is used, since the discharge still liquors are commonly concentrated to recover calcium chloride therefrom, a considerable saving in the cost of evaporating the discharge liquors results because of the absence of the water contained in the milk of lime. It will also be clear that the amount of steam and therefore fuel consumption required for operating the still is considerably decreased due to the decrease in the volume of liquor treated in consequence of avoiding the water in the milk of lime, and the use of less steam in turn results in less water of condensation being added to the discharge liquors and accordingly further decreases the cost of concentrating. There are other advantages attendant upon the use of dry lime, one of which is the increased capacity of the still when using dry lime instead of milk of lime.

Having in mind the advantages of the use of dry lime instead of the milk of lime as the reagent for the setting free of ammonia from a liquor containing fixed ammonia such as is treated in the ammonia soda recovery process, the present invention has been devised for the purpose of solving the problem of utilizing lime in its dry or solid form for this purpose.

The invention comprises the introduction of dry lime against pressure into a system through a conduit in finely divided form, for example powdered or ground, and as a continuously moving stream of relatively small cross section. The divided lime is compacted so that adjacent to the discharge end of the conduit it is in a condition capable of withstanding disrupting forces such as the pressure within the apparatus, to which it is subjected, and which tend to break up the solidity of the stream and create channels or spaces through which liquid or gas may penetrate and escape from the system. Further, the moving stream of lime material is moved forward with such a velocity that the liquid or vapors from the system are prevented from percolating into the stream to an extent which causes the conduit for the moving lime stream to become plugged with a liquid-solid mixture which tends to "set up" or otherwise prevent continuous forward movement of the stream. In other words, the lime is fed into the system as a continuous stream such that the stream of material itself forms a seal against back-flow of gas or liquid from the system into the conduit. Provision is also made for the wetting of the solid particles of the lime material before they emerge into any free gaseous atmosphere in the system so that the particles cannot be carried away as dust with outflowing gases. Again, by introducing the lime as a relatively fast moving stream, and as small particles, there is a rapid and thorough mixing thereof with the liquid and intimate contact between the liquid and the lime, resulting in its efficient and relatively complete utilization. The result is a process which is operative continuously and on a commercial scale.

Other features of the invention will be hereinafter referred to.

In the drawings, in which a number of embodiments of the invention have been selected for illustration:

Figure 1 is a diagrammatic view of an apparatus for recovering ammonia, embodying the invention;

Figure 2 is a sectional view on an enlarged scale of a lime feeding device forming part of the invention;

Figure 3 is a view similar to Figure 1 showing a modified form of the apparatus;

Figure 4 is a sectional view on an enlarged scale of a modified form of a lime feeding device.

Referring to the drawings for a more detailed description of the invention, at 10 is shown a column still which is adapted to receive crude ammoniacal liquor through the pipe 11 from the ammonia soda process apparatus. The still 10 is of a known type in which steam is admitted near the bottom of the column by way of a pipe 12 and bubbles up through the liquid in the column passing through openings 13 and 14 in diaphragms 15 and 16 and from beneath the edges of caps or domes 17 and 18. This is a well known type of still apparatus and no invention is claimed in this feature of the construction. The steam passing upwardly through the column of liquor decomposes the ammonium carbonate content of the liquor thereby setting free the ammonia and carbon dioxide from the compound. As will be seen both ammonia and carbon dioxide gases pass upwardly through the upper end of the tower and through the delivery pipe 19 to suitable collecting chambers.

It will be seen that the liquor entering the column at 11 flows downwardly therethrough by way of the overflow channels 20, a level of liquid being maintained at each chamber as at 21 between the delivery end of one channel and the entrance end of the next.

It will be seen that the lower or delivery end of each channel 20 forms a liquid seal which prevents gas from passing upwardly through the channels so that the gas must pass through the ports 13 and 14 and beneath the edges of the bubbling caps 17 and 18.

With this form of apparatus carbon dioxide is removed from the liquor in the upper portion of the still so that by the time the liquor reaches the level of pipe 22 (Figure 1) it is practically free of ammonium carbonate. The carbon dioxide or ammonium carbonate free liquor, which is thus obtained, is permitted to pass through the pipe 22, provided with a seal or trap 34 to prevent the passage of gas therethrough, into a receptacle 23, known as a prelimer, wherein the liquid is treated with lime to set free fixed ammonia as it occurs for example in the ammonium chloride content of the liquor. This receptacle is provided with a rotating scraping element 23' which keeps the walls clean and assists in the mixing of the lime with the liquor. The liquor after the lime treatment is then returned to the still at a lower level for recovery of any ammonia, still remaining therein, as hereinafter fully described.

It will be seen that the recovery process includes two distillation stages. In the first stage carbon dioxide and free ammonia are removed and in the second stage which follows the lime treatment, the removal of ammonia is completed. It is evident that the two distillation stages of the process could, if desired, be carried out in separate sets of apparatus.

The invention includes the use of dry lime in finely divided form as a reagent for treating the liquor in the receptacle or prelimer 23. According to this invention dry lime is used in a continuous operation and without the disadvantageous features connected with the earlier attempts to make use of dry lime, such as are referred to in Patent No. 198,699 referred to, by continuously delivering the dry lime in powdered or ground form into the prelimer 23 in the following manner. The material for example such as may be obtained by burning a good grade of lime stone and grinding so that the product passes through a 60 mesh screen, is fed through the feeding conduit 25 into the prelimer 23, advantageously below the level 24 of the liquor therein. The method of feeding is such that the dry lime will be compressed and will advance at sufficient velocity in the region of the delivery end of the tube to prevent any detrimental counter flow of gas or liquor into the feeding conduit.

This useful result is achieved preferably by the use of a feeder structure such as that shown in Figure 2 of the drawings. This structure consists of a tapering feeder conduit 25 in which is mounted a screw conveyor 26 having a core member 27 also tapered preferably. The screw is adapted to turn at a relatively high velocity, for example, 850 to 1,500 revolutions per minute. With this arrangement powdered lime fed into the feeding conduit from the chute 28 is moved with such velocity toward the discharge end of the conduit and, by reason of the tapering shell, forced into such a pressed or packed condition that, in effect, a moving plug of material is formed which prevents any detrimental back-flow of liquid or gas into the feeding conduit even under the considerable pressure usually existing in the prelimer, and even at the relatively slower speeds of the screw. By varying the speed of the screw the volume of the moving plug delivered per second may be adjusted to meet the requirements of the ammonia liquor.

In order to provide means for closing the discharge end of the feeding conduit against entry of gas or liquor when for any reason the feed is not in operation, as for example when the machine is shut down, a cut-off slide valve 29 is provided which can be moved quickly to its open or closed position, as may be desired. In starting operations the feeding conduit is filled with lime by operation of the screw conveyor, before the valve 29 is opened. In stopping, the valve 29 is closed before the liquor has an opportunity to penetrate into the conduit behind the valve, thereby maintaining the feeder filled with a pressed plug ready for restarting.

The feeding structure in its preferred form has a flaring nozzle member 30 which permits the expansion of the material fed through the feeding conduit which tends to occur due to the reaction which takes place when the compressed dry material comes in contact with the ammoniacal liquid. In any case, whatever may be the exact explanation thereof, the flaring section facilitates the delivery of the lime and further insures against clogging of the feeding conduit.

The lime thus introduced into the liquid in the prelimer receptacle reacts with the ammonium salts present in the liquor. This reaction results in the setting free of ammonia some of which escapes from the upper end of the prelimer receptacle through the conduit 31 which discharges into the upper end of the column still 10. The liquor, in which practically all the fixed ammonia has been liberated by reaction with the lime, flows from the lower end of the receptacle 23 back to the column still by way of the conduit 32, the conduit 32 having a bend 33 provided in turn with a gas pressure equalizing pipe 35, the level of the bend corresponding to the desired liquor level in the prelimer 23. The liquor returned to the still 10 through the conduit 32, during its passage through the remaining and lower portion of the still, is then subjected to further and final heating by the steam introduced through the steam inlet pipe 12 so that the remaining ammonia contained therein is driven out and passes on upwardly through the still and the residual liquor withdrawn from the still through the discharge pipe 36 is practically free of its original ammonia content, both free and fixed, its main constituents being calcium chloride resulting from the reaction between the lime and the ammonium chloride and sodium chloride corresponding to the sodium chloride content of the original liquor entering the top of the still.

The screw conveyor 26 is operated in any suitable manner, such as by means of a motor 37 and operates to continuously feed lime into the receptacle 23 whenever the slide valve 29 is open, as will be clear. A supply hopper 38, which will hold a substantial quantity of ground lime, is used in connection with the feeder structure described.

It will be seen that in the operation of the lime distillation step of the process, the liquor from the still 10 is introduced into the prelimer receptacle 23 near its upper end and that the outflow of liquor from the receptacle 23 is from the lower end of the receptacle. With this arrangement undissolved inactive ingredients of the lime are prevented from collecting in the lower end of the receptacle 23 since the withdrawal of liquid from the lower end functions to carry away such sediment into the still so that it is necessary only at very infrequent intervals to open the lower end of the receptacle 23 as at 39 for the removal of sludge or sediment. While this is the preferred arrangement, the relative position of the liquor inlet and outlet might be reversed or they might have some other location, with a corresponding change if necessary in the relative position of the lime conduit, the necessary condition being that there should be an intimate and sufficient mixing of the lime with the ammonia liquor in the receptacle 23.

In the modified form of the invention shown in Figure 3 of the drawings, the still 10 and the prelimer receptacle 23 are identical with the corresponding parts shown in Figure 1. However, the method of introducing the lime into the receptacle 23 is somewhat different in that it is fed into the liquor stream going to the receptacle and is then carried in turn by this stream into the receptacle. Preferably the lime is fed into the liquor stream at a level above that of the liquor in the prelimer or receptacle. For this puropse the liquor line 40 (referring to Figure 3) for the passage of liquor from the still to the prelimer has a vertical portion 41 which extends above the level 24 of liquor in the prelimer and into which the lime feeding conduit 25 opens. This lime feeder structure is as shown in Figure 2 hereinabove described. The vertical portion 41 of the liquor conduit may be provided with a helical scraping element 42 having an actuating member 43 and the discharge or end portion of the conduit consists preferably of a horizontal portion 44 provided with a valve 47 which may be of the gate valve type. If necessary a pump 48 is located in the liquor line to provide the desired liquor flow. This arrangement has certain practical advantages. By introducing the lime into a stream of the liquor on its way to the main liquor volume in the receptacle a thorough mixing of the two is facilitated. The arrangement is more flexible than that of Figure 1. It is evident that the receptacle being a relatively large vessel, its position is fixed, and accordingly the position of the lime feeder structure of Fig. 1 is correspondingly fixed. When, however, as in Fig. 3 the lime feeder is connected with a pipe line, it need not be close to the receptacle if for any reason such a location is not available, but the most satisfactory location therefor may be obtained and its position may be varied in any direction merely by a suitable configuration of the liquor line from the still to the receptacle. Again when, as shown in the drawings, the lime feeder is positioned above the level of liquor in the receptacle, it is evident that the back pressure on the stream of lime entering the system will be less than that in an arrangement of the type of Figure 2 where the lime stream is below the liquor level. This pressure may be varied in accordance with the vertical distance between the liquor level in the receptacle and the location of the lime feeder.

In the case of Figure 3, as in that of Figure 1, the relative position of the liquor inlet and outlet of the receptacle may be reversed so that the liquor enters near the bottom and leaves near the top.

While in the two forms of the invention described, we have referred to the feeding of dry lime or lime and liquor into the prelimer receptacle beneath the surface of the liquor, it is possible to deliver lime into the receptacle at a point above the liquor level but when such a method is employed special precautions are necessary, for example to insure adequate mixing of the lime and liquid and to prevent the fine solid lime particles from being carried into the gas exit pipe 31 of the receptacle.

The modified form of feeding device illustrated in Figure 4 of the drawings operates to produce the same function obtained with the feeder device shown in Figure 2, that is, to produce a packing and movement of the material at the discharge end of the feeder tube to provide a liquid and gas seal. The device shown in Figure 4 differs from that shown in Figure 2 in that instead of a tapering feed tube a cylindrical tube 45 is used and the screw conveyor 46 operating therein is formed with a reducing or diminishing pitch which produces the same results, i. e., a progressive packing together of the dry lime particles as they are moved to the exit end of the feeder.

Again, while the invention has been described with particular reference to the type of distilling apparatus usually employed for ammonia liquors which includes a vessel or receptacle separate from the still proper for the lime treatment, the invention is not limited to this particular type of apparatus. With a still of suitable design no intermediate vessel for lime treatment might be necessary, under which conditions the dry lime might be fed directly and continuously into the still proper or into a liquor line between two portions thereof or into the system at any other suitable point.

It will be obvious from the foregoing that variations in detail may be made without departing from the spirit and scope of our invention.

The expression "dry" or "solid" lime as used in this specification is intended to distinguish from a solution, liquid suspension or emulsion of lime or the like where the water carrying the lime in solution or suspension fills the voids between the lime particles and prevents the back-flow of gas or liquor or from a solution, liquid suspension or emulsion of lime or the like which does not, as does the dry lime material, tend to "set-up" as hereinabove described so as to make inoperative an ordinary feeding procedure. The active lime of the dry lime material may consist substantially wholly of quick lime or it may consist in whole or in part of the hydrated variety or it may be in any other form provided it reacts with the fixed ammonia of the ammonia liquor as already set forth.

By "seal" in the claims is not meant that absolutely no gas and/or liquor penetrates the lime conduit to any extent however small. Rather it is intended to convey the requirements of an operative process and apparatus as hereinabove described. On the one hand there is no back-flow such as would result in losses from the system and on the other hand penetration of gas and/or liquor to the extent that it may occur is to such a limited distance and for such an extremely short period of time, due to the velocity of the constantly moving lime stream, that the lime has no opportunity to "set up" in the conduit with scale formation, prohibitive resistance to movement of the lime stream or building up of a solid cement like plug.

While the invention has been described in connection with an apparatus and process involving pressure conditions above atmospheric, the invention may also be used to advantage with an apparatus involving either normal or reduced pressure conditions, such as prevail in a reduced pressure or vacuum ammonia distillation process, for example, since even under such conditions of pressure the dry lime being introduced into the apparatus tends to absorb water and vapors due to surface action, capillarity, and the like, and to assume a hard set-up condition unless the feeding be conducted substantially in accordance with the present invention.

What we claim is:

1. The process for feeding substantially dry finely divided solid material into a body of liquor which comprises feeding finely divided material into a conduit, compacting the material in the conduit into a compact mass filling a cross-section of the conduit and continuously advancing thus compacted material through an open end of the conduit and thence into said ammonia solution.

2. The process for feeding substantially dry finely divided solid material into a body of liquid which comprises feeding the solid material in finely divided form as a continuous forward-moving stream through a conduit and into the liquid and compacting said material at the discharge end of the conduit into a compact mass filling the discharge end of the conduit.

3. The process for feeding substantially dry finely divided solid lime into a body of liquid which comprises feeding the solid material in finely divided form as a continuous forward-moving stream through a conduit opening into the solution and packing said material at the discharge end of the conduit whereby back-flow of solution into the conduit is prevented.

4. The process for using lime in solid form in the recovery of ammonia from solution which comprises feeding solid finely divided lime into a conduit, compacting the lime in the conduit into a compact mass filling a cross-section of the conduit and continuously advancing thus compacted material through an open end of the conduit and thence into said ammonia solution.

5. The process for using lime in solid form in the recovery of ammonia from solution which comprises packing lime in finely divided form, feeding the compact material through a conduit as a mass of material continuously filling a cross-section of the conduit and advancing the compacted material through an open end of said conduit into the ammonia solution.

6. The process for using lime in solid form in the recovery of ammonia from solution which comprises feeding solid finely divided lime into a conduit opening into an ammonia solution, compacting the lime in the conduit into a compact mass filling a cross-section of the conduit and continuously advancing thus compacted material through an open end of the conduit and thence into said ammonia solution at a point below the surface thereof.

7. The process for using lime in solid form in the recovery of ammonia from solution which comprises feeding solid finely divided lime into a conduit opening into an ammonia solution, compacting the lime at the discharge end of the conduit into a compact mass filling the discharge end of the conduit and continuously advancing thus compacted material through the end of the conduit into said ammonia solution.

8. The process for using lime in solid form in the recovery of ammonia from solution which comprises feeding the solid material in finely divided form as a continuous forward-moving stream through a conduit and into the solution and compacting said material at the discharge end of the conduit into a compact mass filling the discharge end of the conduit.

9. In combination in an apparatus for the treatment of a liquid with finely divided solid, a liquor receptacle, a conduit opening into said receptacle and means for feeding finely divided solid material through said conduit and packing said material at the discharge end thereof.

10. In a device for feeding divided solid material into a vessel containing liquid under pressure, a conduit opening into the side of the vessel at a point below the level of the liquid therein, said conduit converging toward its discharge end, a screw conveyor operably mounted in said conduit, means for feeding material to the outer end of the conduit, and said conduit having a flaring section immediately at its discharge end.

11. In combination in an apparatus for recovering ammonia from aqueous ammonia liquor, a liquor receptacle, a conduit opening into said receptacle at a point below the normal level of liquid therein and means for feeding finely divided solid lime through said conduit and packing said lime at the discharge end thereof.

12. In combination in an apparatus for recovering ammonia from aqueous ammonia liquor, a prelimer, a conduit opening into the side wall of said prelimer at a point beneath the level of liquor therein, and means for feeding finely divided dry lime through said conduit into the prelimer, said conduit having converging walls whereby to produce a packing of the material fed therethrough at the discharge end thereof.

13. In combination in an apparatus for recovering ammonia from aqueous ammonia liquor, a prelimer, a liquor inlet conduit opening into the prelimer, a conduit leading from the side wall of the prelimer at a point below the level of liquor therein, a screw conveyor operating in the conduit, means for driving the screw conveyor, a supply hopper for ground lime connecting with the outer end of the conduit, said conduit having a tapering formation whereby to produce a packed condition of the material fed therethrough at the discharge end of the conduit, and a conduit through which the liquor after the lime treatment is delivered from the lower end of the prelimer.

14. In combination in an apparatus for recovering ammonia from aqueous ammonia liquor, a prelimer, a liquor inlet conduit opening into the prelimer, a portion of said conduit being above the level of liquor in the prelimer, and a continuously operable ground dry lime conveyor associated with said portion of the liquor inlet conduit above the liquor level in said prelimer, said conveyor comprising a conduit with converging walls and a rapidly rotating screw therein whereby to produce a seal at the discharge end of said converging conduit.

15. The process for introducing substantially dry finely divided solid material into a liquid, which comprises feeding the finely divided material into a conduit, compacting the material in the conduit into a compact mass filling a cross-section of the conduit, advancing the thus compacted material through an open end of the conduit, and conveying a stream of said liquid past the open end of the conduit so that the compacted solid material is taken into the stream and conveyed along therewith.

16. The process for introducing substantially dry finely divided lime into aqueous ammonia solution, which comprises feeding the finely divided lime into a conduit and compacting the lime in the conduit into a compact mass filling a cross-section of the conduit, and advancing the thus compacted lime through an open end of the conduit into a stream of the ammonia solution flowing past the open end of the conduit.

DAVID D. MOHLER.
WILLIAM N. HENDERSON.